United States Patent [19]

Semba

[11] Patent Number: 5,323,368
[45] Date of Patent: Jun. 21, 1994

[54] TRACK CROSSING APPARATUS AND METHOD USING THE DIFFERENCE BETWEEN PICK-UP VELOCITY AND A PREDETERMINED VELOCITY

[75] Inventor: Tetsuo Semba, Zama, Japan

[73] Assignee: International Business Machines Corporation, Armonk, N.Y.

[21] Appl. No.: 977,467

[22] Filed: Nov. 17, 1992

[30] Foreign Application Priority Data

Dec. 26, 1991 [JP]  Japan .................................. 3-344195

[51] Int. Cl.⁵ .............................................. G11B 17/22
[52] U.S. Cl. ..................................... 369/32; 369/44.28
[58] Field of Search ................ 369/32, 44.28, 44.27, 369/44.25, 44.11, 58; 360/78.06, 73.03, 77.02

[56] References Cited

U.S. PATENT DOCUMENTS

| | | | |
|---|---|---|---|
| 4,730,298 | 3/1988 | Takahashi | 369/44.28 |
| 4,731,771 | 3/1988 | Maeda et al. | 369/44.28 |
| 5,182,736 | 1/1993 | Yanagi | 369/32 |
| 5,191,566 | 3/1993 | Yamaguchi et al. | 369/44.28 |
| 5,225,253 | 10/1993 | Kagami et al. | 369/32 |
| 5,241,522 | 8/1993 | Yanagi | 369/44.28 |

FOREIGN PATENT DOCUMENTS 63-48665   3/1988  Japan .
63-274386  11/1988 Japan .
0189088    4/1989  Japan .

OTHER PUBLICATIONS

IBM Technical Disclosure Bulletin "Digital Sector Servo System" vol. 22, No. 6, Nov. 1979, pp. 2476-2481.

Primary Examiner—Robert J. Pascal
Assistant Examiner—Tan Dinh
Attorney, Agent, or Firm—H. St. Julian; M. W. Schecter

[57] ABSTRACT

To accomplish both fast track access and low power consumption in an apparatus for recording or reading out a signal onto or from a track of a recording medium. The actuator control apparatus uses a tracking error signal (TES), which is a signal whose level varies, with the time taken for a pickup to cross one track being used as a cycle. It detects the velocity of the pickup from the time interval (Ti) of the mean level crossing by TES, and provides an actuator with a signal having a pulse width (Tf) proportional to the time interval of the mean level crossing by TES, in synchronization with the crossing of the mean level by TES.

6 Claims, 6 Drawing Sheets

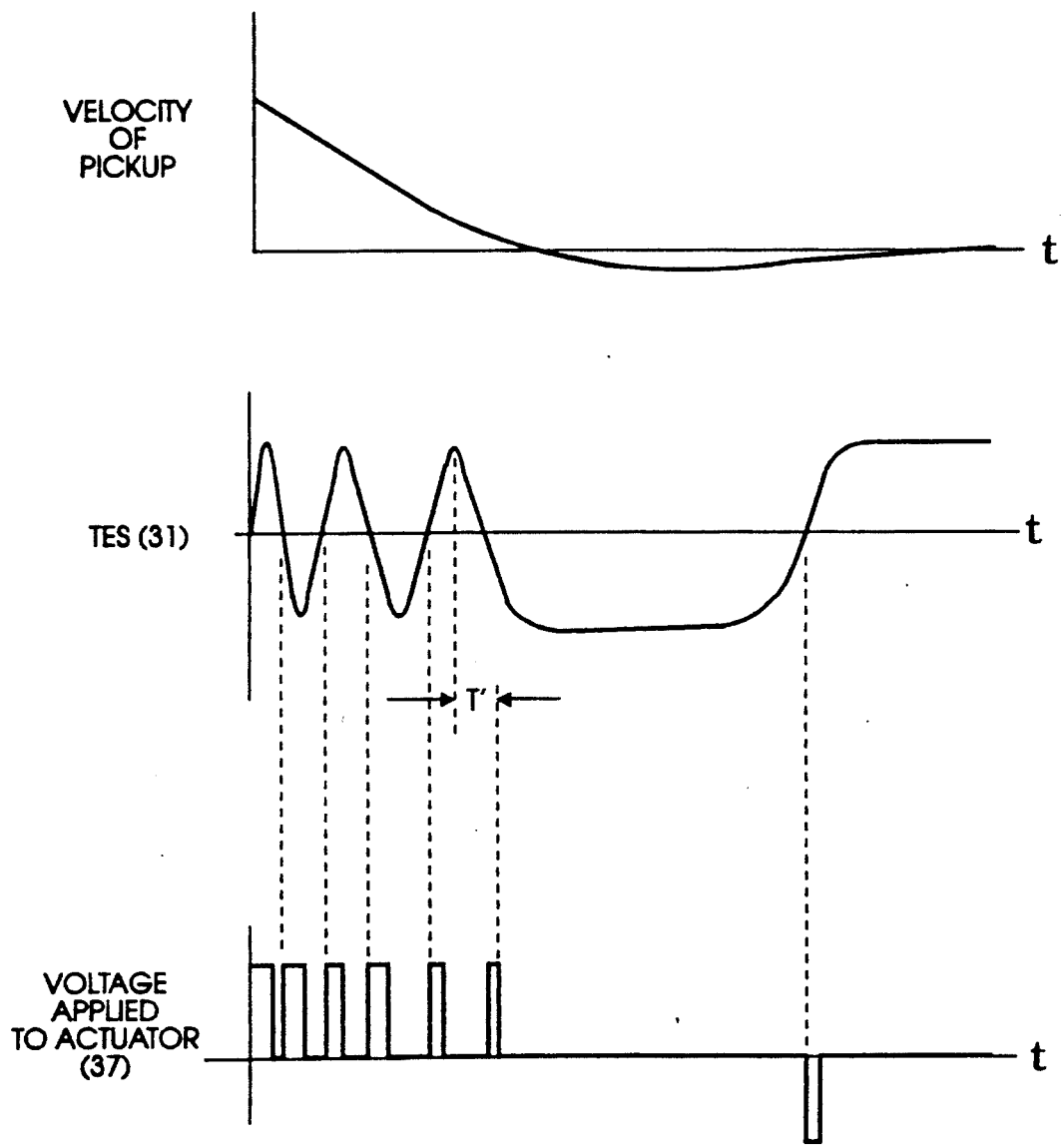

TRACK CROSSING APPARATUS AND METHOD USING THE DIFFERENCE BETWEEN PICK-UP VELOCITY AND A PREDETERMINED VELOCITY

BACKGROUND OF THE INVENTION

The present invention is related to an apparatus for recording or reading out a signal onto or from a track of a recording medium such as a magnetic disk or optical disk, and more particularly, to an apparatus and method for performing the control of an actuator for moving a pickup for recording or reading out a signal onto or from a track to a target track (hereinafter referred to as track access). In this specification, "recording" is a concept including erasing, and "optical disk" is a concept including magneto-optical disks.

DESCRIPTION OF THE RELATED ART

In an apparatus that records or reproduces information by using a disk, tracks for recording signals are concentrically or spirally arranged, and an actuator for moving the pickup is controlled when the pickup moves from the current track to a target track. The conventional actuator control technique is described below with reference to several publications.

First, in a Published Unexamined patent application Ser. No. 63-48665, a track access method is proposed in which the pickup jumps at one time over a plurality of tracks from any track to a target track. In this method, the actuator is controlled so as to keep the velocity of the pickup constant. However, for a data recording system in which it is required to access a target track in the shortest possible time and read or write data quickly, it is known that keeping the acceleration constant rather than keeping the velocity constant makes the access time shorter. Consequently, the method described in the above official gazette involves the problem that the shortening of the access time, one of the most important subjects in track access, is not fully accomplished.

A more detailed description of the above method is as follows. Track crossing pulses, whose polarity varies each time they cross the center of a track or the center of a groove between tracks, are generated from a tracking error signal (to be described later with reference to FIG. 1). With the first track crossing pulse, a start pulse for moving the pickup to a target track is generated, and with the last track crossing pulse, a stop pulse for stopping on the target track is generated. From each edge of the track crossing pulses, a pulse is generated to compensate for the kinetic energy lost by the actuator, thereby maintaining a fixed velocity. Accordingly, the width of the compensating pulse does not vary during the pickup movement, though it may vary among disks, and thus this method is not suitable for precise velocity control for acceleration or deceleration.

In a Published Unexamined patent application Ser. No. 64-89088, a method is proposed for controlling the carriage driving of a magnetic disk unit by the pulse-width modulation. This method provides a driving pulse to the carriage by comparing the level of a position signal determined by the current position with that of a reference signal determined by the target position. Accordingly, although it is suitable for control when the pickup always traces a certain track, this method involves the problem that if it is applied to control for moving the pickup from one track to another track, means must be provided for continuously detecting the position of the pickup while it is moving.

In a Published Unexamined patent application Ser. No. 63-274386, a method is proposed for driving the actuator of a magnetic disk by the pulse-width modulation. This method determines the velocity of the actuator from the back electromotive force generated in the coil of a voice coil motor. In consequence, this method involves the problem that, since a sufficient back electromotive force is not obtained in high-loss actuators of the linear motor type, which are often used for optical disk units, the velocity cannot be accurately detected, and the method cannot be applied to track access for optical disk units without modification.

In IBM TDB Vol. 22, No.6, pp. 2476–2481, a method is proposed wherein the disk surface is divided into several sectors and positional information for tracking is recorded in each sector beforehand, and the pickup's position is controlled by the pulse-width modulation. This method reads the address information recorded in the sector of the track above which the pickup is positioned during the movement of the pickup, calculates the difference between the current track and the target track, and provides the actuator with a driving pulse whose value is proportional to the difference. Accordingly, if one sector is long, the time during which no address information is obtained from the disk surface becomes long, and control is difficult. As a result, it is easily affected by vibration outside the disk unit. A further problem is that this method cannot be applied to optical disk units, in which the pickup moves at a high speed and address information cannot be read accurately.

Control of the velocity of a pickup by means of a digital-to-analog converter (DAC), which is typical of conventional optical disks, is now described with reference to FIG. 1. FIG. 1 shows the tracking error signal (TES) and the DAC output when the pickup is approaching a target track while it is being decelerated. The level of the tracking error signal varies in the shape of a sinusoidal wave, with the time taken for the pickup to cross one track being used as a cycle, and its mean level is zero. As shown in FIG. 1, as the velocity of the pickup slows down, the cycle of the tracking error signal also becomes longer. The mechanism for generating the tracking error signal will be described later with reference to FIG. 3.

In a system using a DAC, the current velocity of the pickup is calculated from the time interval of zero level crossing by the tracking error signal, and the difference between the current velocity and a predetermined velocity is calculated in a digital circuit. The calculation result is converted into an analog value by the DAC, and a driving pulse with a power proportional to the conversion result is applied to an actuator. One of the factors for determining the DAC output value P in FIG. 1 is the time interval of zero level crossing by the tracking error signal. In this system, a driving signal of a fixed level is supplied to the actuator from the time that the tracking error signal crosses the zero level until the time of the next crossing. A zeroth-order hold circuit is normally used as a DAC. Its transfer function is described by the following formula:

$$G(\omega) = 2 \sin(\omega h/2) \cdot \exp(-j\omega h/2) / \omega h.$$

Here, G is gain, $\omega$ is the angular frequency of the driving signal of the actuator, and h is the sampling interval.

From the factor of $\exp(-j\omega h/2)$, it is seen that the time lag between the velocity detection and the actuator driving (the time interval T in FIG. 1) becomes greater as the sampling interval becomes longer. For this reason, it is difficult to stabilize the servo loop by increasing the servo gain in a high frequency band. In addition, if there is track displacement due to the eccentricity of a disk at the track access settling time, and if the tracking error signal does not cross the zero level by chance, then new data is not loaded into the DAC and the power supplied to the actuator is excessive. The interval between time t1 and time t2 in FIG. 1 is an example of this situation. Accordingly, the track access technique using the conventional DAC involves the problem that it is difficult to make the velocity converge to zero. Moreover, in an optical disk unit using a piggy-back actuator, power consumption is normally higher, because its actuator is heavier than that of a magnetic disk unit. The technique using a DAC as shown in FIG. 1 to modulate the level of the actuator driving signal has not solved the power consumption problem.

SUMMARY OF THE INVENTION

The present invention was made to solve the problems of the prior art as described above, and its object is to accomplish both high-speed track access and low power consumption in an apparatus for recording or reading out a signal onto or from a track of a recording medium. In order to solve the above problems, the actuator control apparatus of the invention employs the following techniques: using a tracking error signal whose level varies, with the time taken for a pickup to cross one track being used as a cycle, detecting the velocity of the pickup from the time interval of the mean level crossing by the signal, calculating the difference between the detected velocity and a predetermined velocity, and providing the actuator with a signal having a pulse width proportional to the difference and to the time interval of the mean level crossing by the tracking error signal, in synchronization with the crossing of the mean level by the tracking error signal.

As described above, since the present invention detects the velocity from the time interval of the mean level crossing by the tracking error signal each time the tracking error signal crosses the mean level, the velocity can be accurately detected even if the pickup moves at a high speed. In consequence, it is easy to control the velocity in order to keep the acceleration constant, and this contributes to the shortening of the access time. In addition, since the width of the pulse for driving the actuator is proportional to the difference between the current velocity and the predetermined velocity, accurate control can be maintained. Therefore, the pickup can be reliably decelerated to velocities that enable it to be pulled into the control loop for track following after the track access. Further, the pulse width is made proportional to the time interval of the mean level crossing by the tracking error signal, and the pulse is generated immediately after the measurement of that time interval in synchronization with the tracking error signal. This allows the time lag between velocity detection and actuator driving to be shortened and the control band to be made higher, and thus allows more accurate velocity control. In addition, only a low level of power consumption is required, because the actuator is driven by a pulse-width control method.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 6 is a graph showing the relationship between the velocity of the pickup and signal waveforms in the actuator control apparatus.

DESCRIPTION OF THE PREFERRED EMBODIMENT

Figure 2:
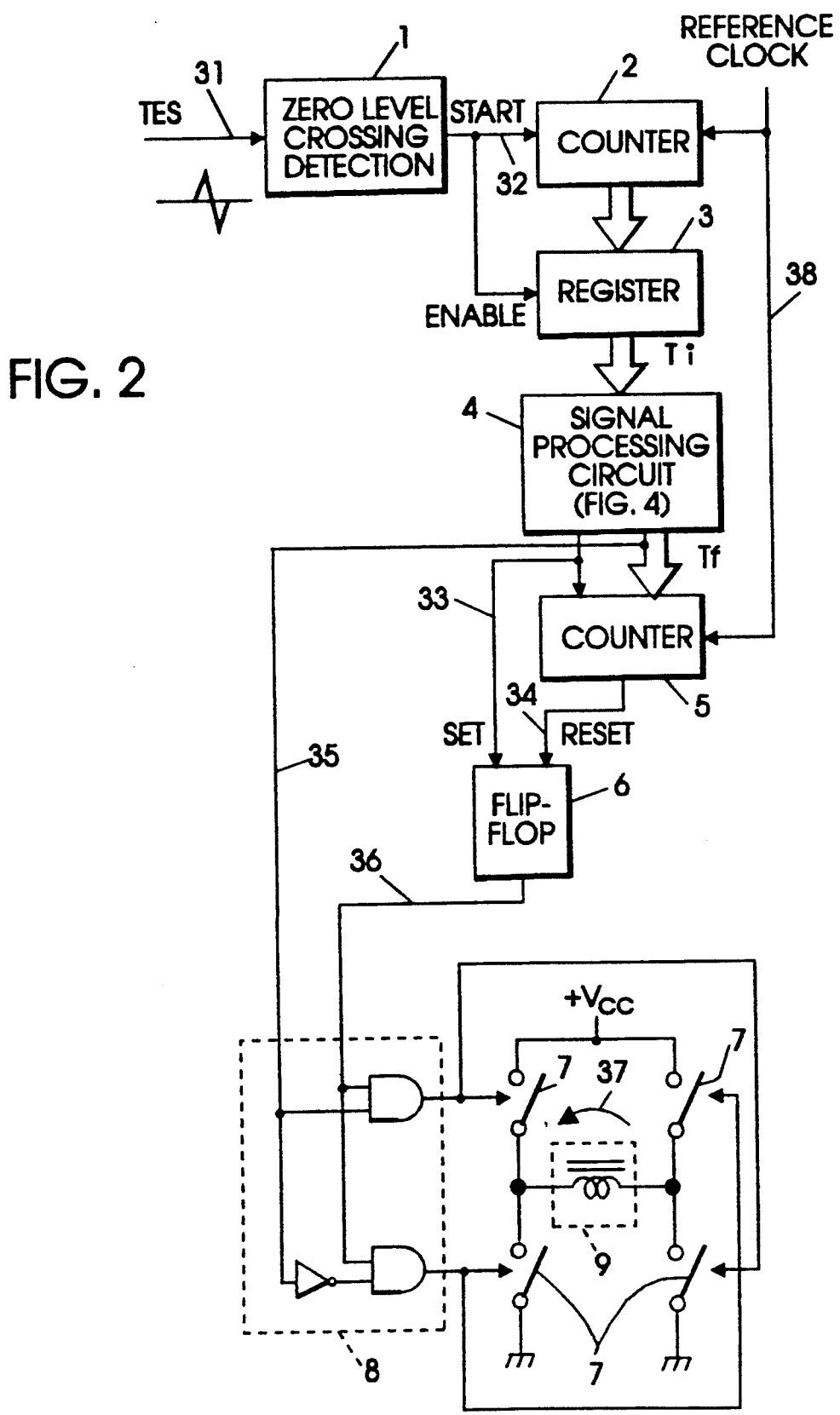
FIG. 2 is a block diagram of the actuator control apparatus according to the embodiment of the present invention.
Figure 3:
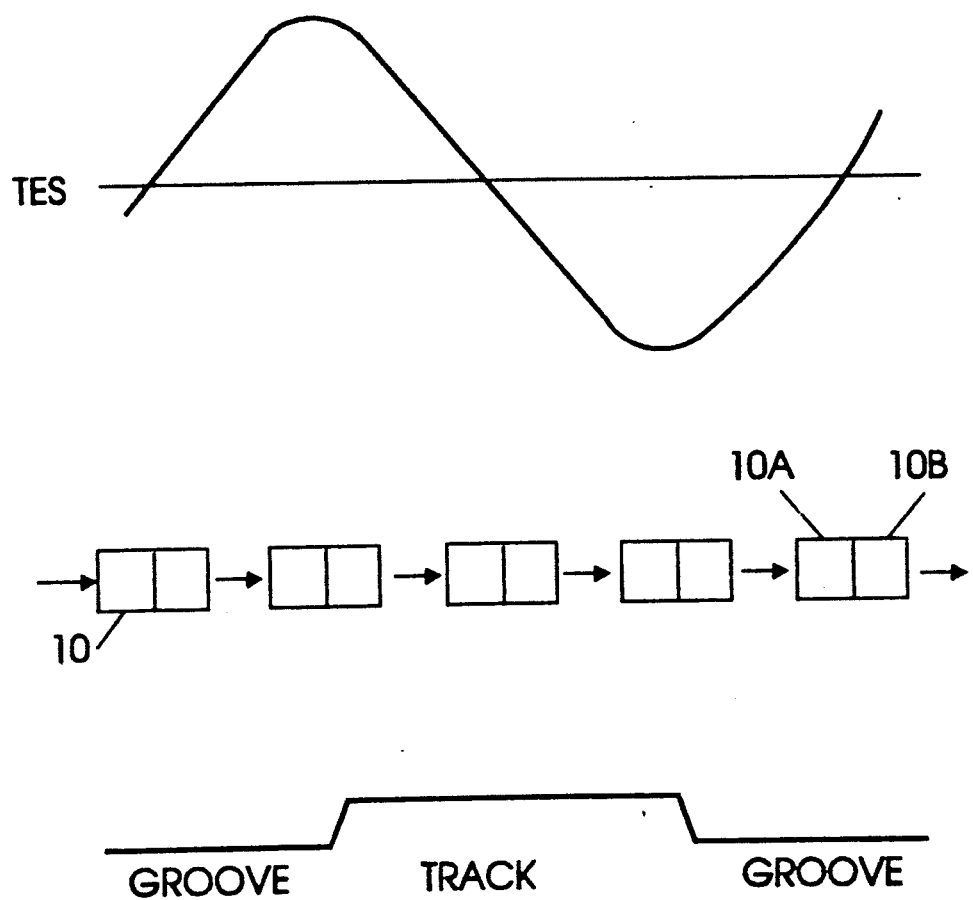
FIG. 3 is a block diagram showing the generation mechanism of a tracking error signal.

One embodiment of the present invention is now described with reference to the drawings. FIG. 2 is a block diagram of the embodiment of the present invention. The mean level crossing detection circuit 1 of a tracking error signal (TES), constituted by a comparator, generates a pulse when the tracking error signal 31 has crossed the mean level voltage, often in vicinity of 0 V. The means for generating tracking error signals in optical disk units is now described with reference to FIG. 3. In this example, a split photodiode detector 10 is used to detect light reflected from the disk surface. If the optical pickup is positioned above the center of a groove or the center of a track, the split photodiode detector 10 is exposed symmetrically to a light. In contrast, if the optical pickup starts to deviate from a track, the light reflected from the disk surface hits the split photodiode detector 10 asymmetrically with respect to the center thereof. Accordingly, the differential signal of the output of the detectors 10a and 10b becomes a sinusoidal signal, with the time taken for the pickup to cross one track being used as a cycle.

Any methods for obtaining a tracking error signal in optical disks, such as a three-beam method, have been proposed in addition to the above, but descriptions of them are omitted because they are all well known to those skilled in the art. As a tracking error signal for magnetic disks, a triangular wave-like signal is disclosed in the U.S. Pat. No. 4,691,152.

Referring again to FIG. 2, the time interval of mean level crossing by the tracking error signal is detected by a counter 2 that counts the number of pulses of a reference clock 38. Counter 2 is reset by the output 32 of a mean level crossing detection circuit 1. A register 3 holds the output of counter 2 each time the tracking error signal crosses the mean level. Register 3 is enabled by output 32 of mean level crossing detection circuit 1.

Figure 1:
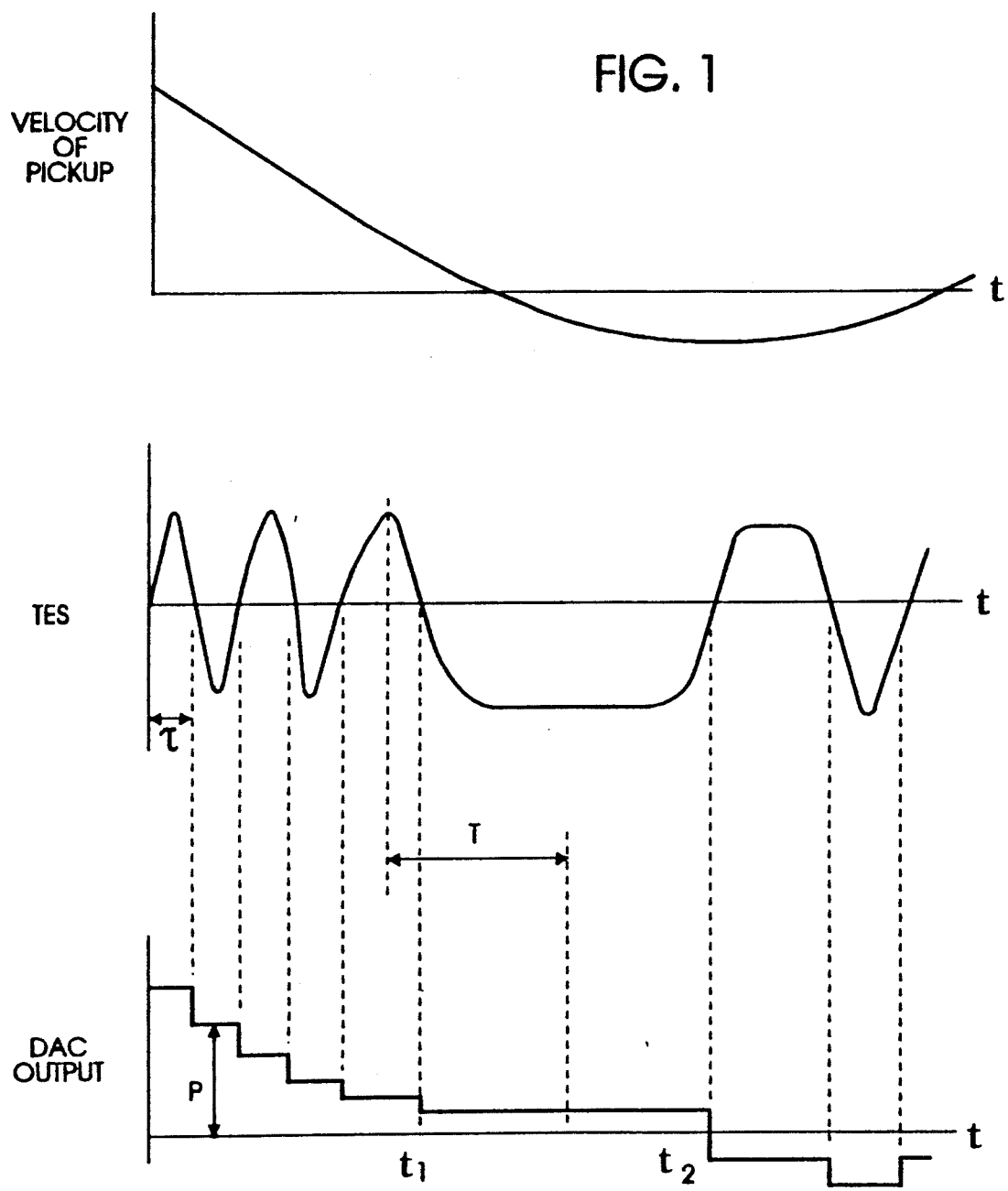
FIG. 1 is a graph showing the relationship between the velocity of the pickup and signal waveforms in an actuator control method using a conventional DAC.
Figure 4:
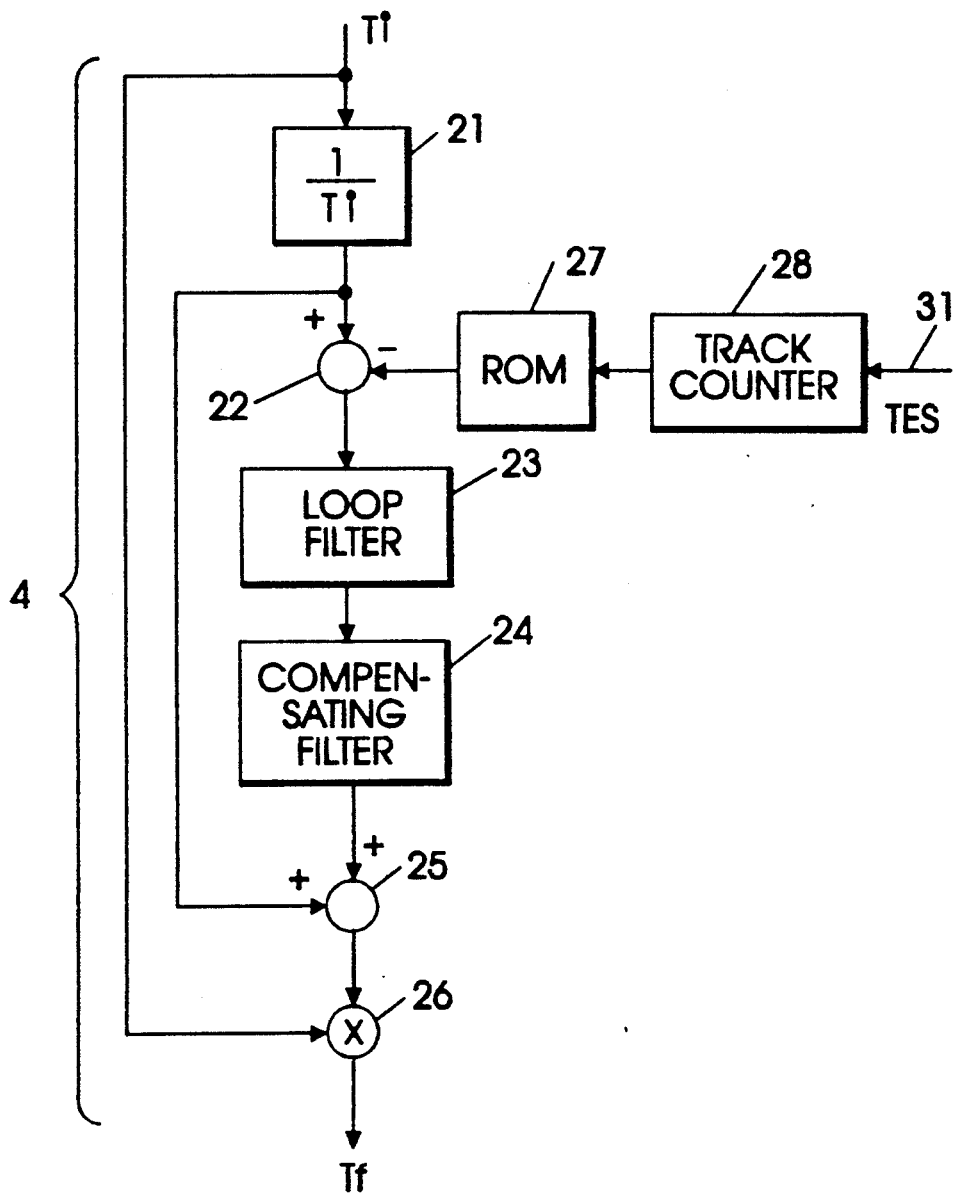
FIG. 4 is a block diagram of the signal processing circuit of the actuator control apparatus.

A signal processing circuit 4 calculates the velocity of the pickup from the time interval of mean level crossing held in register 3, and calculates the time width of a pulse for a driving actuator 9 from the difference between the above velocity and a predetermined velocity. The details are described with reference to FIG. 4. Signal processing circuit 4 consists of an inverse calculating circuit 21, a subtracter 22, a loop filter 23, a compensating filter 24, an adder 25, a multiplier 26, a ROM 27, and a track counter 28. Inverse calculating circuit 21 calculates the velocity of the pickup from a mean level crossing time interval (Ti). Track counter 28, which receives tracking error signal 31 as an input, decreases the number of tracks to be crossed in order to reach a target track each time one track is crossed. The current count of track counter 28 is input to ROM 27 as an address thereof. ROM 27 outputs a predetermined velocity determined by the number of tracks to the target track. For instance, to execute deceleration as shown in FIG. 1, the value of the predetermined velocity is preset so as to be proportional to the number of tracks to the target track. Subtracter 22, into which the outputs of inverse calculating circuit 21 and ROM 27 are input, calculates the difference between the current velocity and the predetermined velocity.

Control loop filter 23 reduces the noise caused by actuator 9, compensates for the delay, and amplifies the signal level. Compensating filter 24 compensates for changes in frequency characteristics due to the driving of actuator 9 by a voltage pulse. Adder 25 cancels the back electromotive force generated in actuator 9. That is, it adds the velocity calculated in inverse calculating circuit 21 to the output of filter 24 to cancel the back electromotive force generated by actuator 9, whereby the force generated by actuator 9 is made proportional to the voltage applied thereto.

This point is now described in detail. If it is supposed that the impedance of the actuator is $j\omega L + R$, that the flowing current is $I(j\omega)$, and that the back electromotive force is $E(j\omega)$, then the applied voltage V of the actuator is expressed by $$V(j\omega) = (j\omega L + R)*I(j\omega) + S(j\omega)$$

The back electromotive force $E(j\omega)$ is proportional to the velocity of actuator 9. Consequently, a characteristic of $(j\omega L + R)$ is provided to compensating filter 24 in order to eliminate the effect of $E(j\omega)$, thereby making the output of loop filter 23 proportional to the current $I(j\omega)$ flowing in the actuator.

Multiplier 26 multiplies the output of adder 25 by the time interval Ti of mean level crossing by the error signal. As a result, a value (Tf) of the width of the pulse for driving actuator 9 is obtained by signal processing circuit 4 in FIG. 2, from the time interval of mean level crossing by the tracking error signal. As shown in FIG. 2, a counter 5 and a flip-flop 6 generate a pulse having a width proportional to the value (Tf) calculated by signal processing circuit 4. Counter 5 counts the number of pulses of reference clock 38. The output (Tf) of signal processing circuit 4 is preset in counter 5, and the count is initiated by a signal 33 which is output when signal processing circuit 4 ends the calculation. The count value decreases for each pulse of reference clock 38, and a count end signal 34 is output when the count value equals zero. Flip-flop 6 outputs a pulse whose width is equal to the time period during which counter 5 is counting the number of pulses. The flip-flop is set by calculation end signal 33 from signal processing circuit 4 and reset by count end signal 34 from counter 5. As long as flip-flop 6 is set, its output 36 is at a high level.

Actuator 9 is usually provided with a linear motor in optical disks, and a voice coil motor in magnetic disks. Switches 7 turn such motors on and off. The switches are configured in the shape of a bridge, and actuator 9 is driven by a pulse. A logic circuit 8 selects switches 7. Logic circuit 8 selects two of the four switches according to the sign polarity of the output of signal processing circuit 4 when the output of flip-flop 6 is at a high level.

Figure 5:
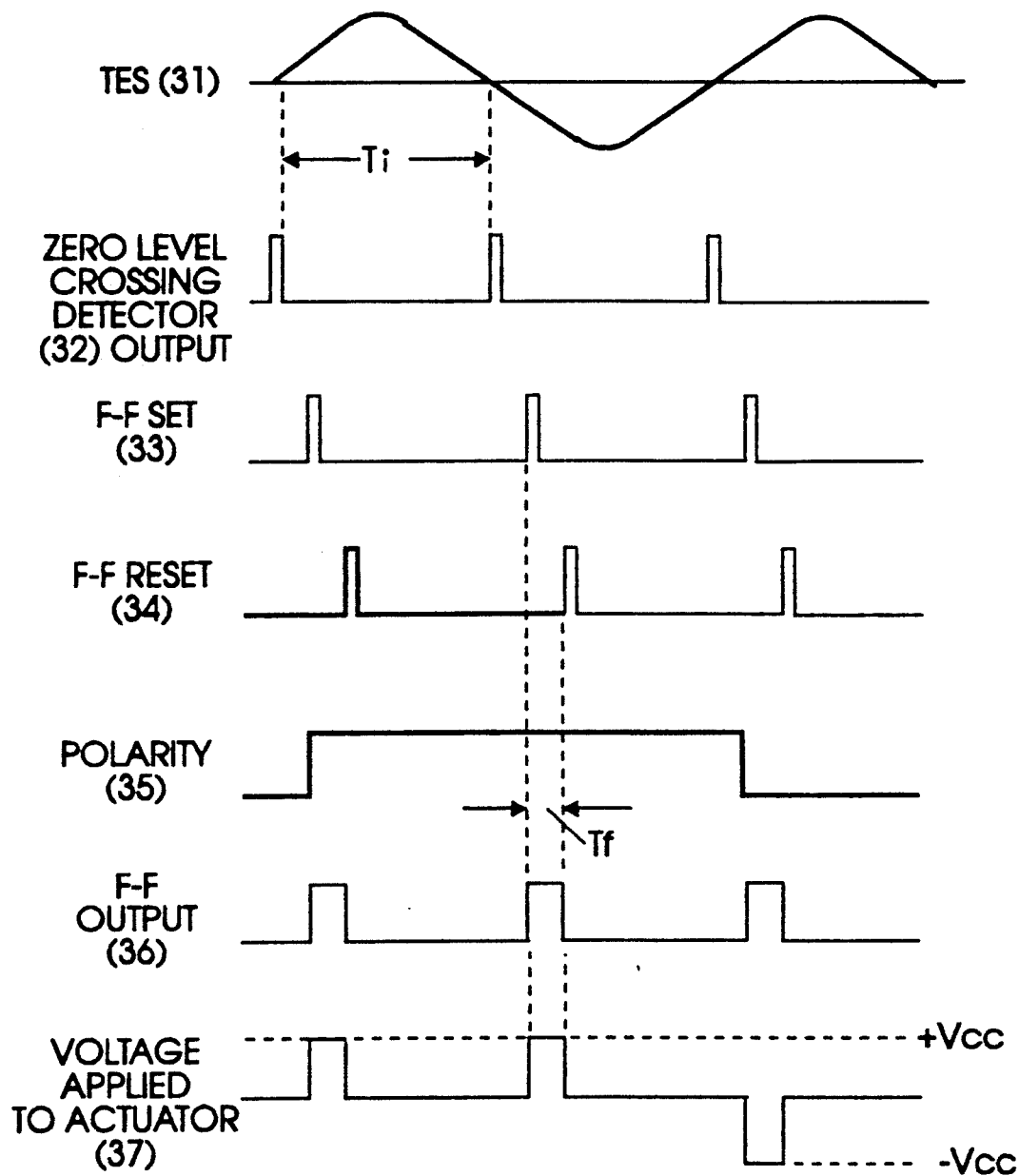
FIG. 5 is a timing diagram showing the various signals of the actuator control apparatus.

FIG. 5 shows the waveforms of the signals related to FIG. 2. As already described, the output 32 of mean level crossing detector 1 goes to a high level at the moment that the tracking error signal crosses the mean level voltage, often in the vicinity of 0 V. Subsequently, calculation by signal processing circuit 4 ends and signal 33 becomes high, and signal 34 becomes high after the elapse of time period Tf. The output 36 of flip-flop 6 remains at a high level during the time period Tf. A signal 35 represents the sign polarity of the calculation result of signal processing circuit 4. The level of signal 35 changes according to whether the current velocity is larger or smaller than the target velocity. A voltage signal 37 is actually applied to the actuator. Depending on the selection result of switches 7, a driving pulse of +Vcc or −Vcc is applied to actuator 9.

For comparison with the prior art (FIG. 1), FIG. 6 shows the waveforms of tracking error signal 31 and actuator driving pulse 37 when the pickup is approaching a target track while being decelerated. It is seen that, in the present invention, the pulse is output only at the moment the tracking error signal crosses the mean level, and thus the time lag between the velocity detection and the actuator driving (the time interval designated as T' in FIG. 6) is shorter than the time lag in the prior art (the time interval designated as T in FIG. 1).

As is seen from the above embodiment, in an apparatus for recording or reading out a signal onto or from a track of a recording medium, by detecting the velocity of a pickup from the time interval of the mean level crossing by a tracking error signal, and by driving an actuator with a pulse whose width is proportional to the difference between the detected velocity and a predetermined velocity, the velocity of the pickup can be accurately controlled even in high-speed track access, thereby allowing easy track following control after the end of access. In addition, by employing a pulse-width modulation for driving the actuator, the power consumption in the driver circuit can be reduced. Moreover, by providing the actuator with a signal having a pulse width proportional to the time interval of the mean level crossing by the tracking error signal, in synchronization with the crossing of the mean level by the tracking error signal, it is possible to avoid excessive power supply at low speeds where velocity detection becomes less frequent and thus to increase the performance of velocity control.

The present invention can be widely applied to apparatuses for recording or reproducing signals on the tracks of recording media, and is fully applicable not only to optical disk units and magnetic disk units but also to capacitance type disk units and optical cards.

While the invention has been particularly shown and described with reference to preferred embodiments thereof, it will be understood by those skilled in the art that various changes in form and details may be made therein without departing from the spirit and scope of the invention.

What is claimed is:

1. In a recording system comprising a recording medium, an optical pickup for recording a signal onto a track on said recording medium or for reading out a signal from a track of said recording medium or for reading out a signal from a track of said recording medium, and an actuator for moving said pickup, an apparatus for controlling said actuator so as to cause said pickup to move from a track that is currently tracing to a target track, comprising:

means for generating a signal whose level varies, with the time taken for the pickup to cross one track being used as a cycle;

a first means for determining the velocity of the pickup from a time interval of the mean level crossing by said signal;

a second means for determining the difference between the velocity of the pickup and a predetermined velocity;

a third means for determining the pulse width of a driving pulse to be applied to the actuator in accordance with said difference, said pulse width proportional to the difference between the velocity of the pickup and the predetermined velocity, and to the time interval of the mean level crossing by said signal; and means for applying the driving pulse of said pulse width to said actuator in synchronization with the mean level crossing by said signal.

2. In a recording system comprising a recording medium, an optical pickup for recording a signal onto a track on said recording medium or for reading out a signal from a track of said recording medium or for reading out a signal from a track of said recording medium, and an actuator for moving said pickup, an apparatus for controlling said actuator so as to cause said pickup to move from a track that is currently tracing to a target track, comprising:

means for generating a signal whose level varies, with the time taken for the pickup to cross one track being used as a cycle;

a first means for determining the velocity of the pickup from a time interval of the mean level crossing by said signal;

a second means for determining the difference between the velocity of the pickup and a predetermined velocity;

a third means for determining the pulse width of a driving pulse to be applied to the actuator in accordance with said difference, said third determining means comprising filter means for the output of said means for calculating velocity difference, means for adding the velocity of said pickup to the output of said filter means, and means for multiplying the output of said adding means by the time interval of the mean level crossing by said signal; and means for applying the driving pulse of said pulse width to said actuator in synchronization with the mean level crossing by said signal.

3. An apparatus as set forth in claim 1, further comprising means for counting the number of tracks to the target track, and ROM means for outputting the predetermined velocity upon input of the number of tracks to the target track.

4. A recording system comprising:

a pickup for recording a signal onto a track of a recording medium or for reading out a signal from a track of said recording medium;

an actuator for moving said pickup;

means for generating a signal whose level varies, with the time taken for the pickup to cross one track being used as a cycle;

a first means for determining the velocity of the pickup from a time interval of the mean level crossing by said signal;

a second means for determining the difference between the velocity of the pickup and a predetermined velocity;

a third means for determining the pulse width of a driving pulse to be applied to the actuator in accordance with said difference, said pulse width proportional to the velocity of the pickup, and to the time interval of the mean level crossing by said signal; and means for applying the driving pulse of said pulse width to said actuator in synchronization with the mean level crossing by said signal.

5. A recording system comprising:

a recording medium;

a pickup for recording a signal onto a track of said recording medium or for reading out a signal from a track of said recording medium;

an actuator for moving said pickup;

means for generating a signal whose level varies, with the time taken for the pickup to cross one track being used as a cycle;

a first means for determining the velocity of the pickup from a time interval of the mean level crossing by said signal;

a second means for determining the difference between the velocity of the pickup and a predetermined velocity;

a third means for determining the pulse width of a driving pulse to be applied to the actuator in accordance with said difference, said pulse width proportional to the velocity of the pickup, and to the time interval of the mean level crossing by said signal; and means for applying the driving pulse of said pulse width to said actuator in synchronization with the mean level crossing by said signal.

6. In a recording system comprising a recording medium, a pickup for recording a signal onto a track of said recording medium or for reading out a signal from a track of said recording medium, and an actuator for moving said pickup, a method for controlling said actuator so as to cause said pickup to move from the track that it is currently tracking to a target track, said method including the steps of:

generating a signal whose level varies, with the time taken for the pickup to cross one track being used as a cycle;

detecting the velocity of the pickup from a time interval of the mean level crossing by said signal;

determining the difference between the velocity of the pickup and a predetermined velocity;

determining the pulse width of a driving pulse to be applied to the actuator in accordance with said difference, said pulse width proportional to the velocity of the pickup, and to the time interval of the mean level crossing by said signal; and applying the driving pulse of said pulse width to said actuator in synchronization with the mean level crossing by said signal.

* * * * *